US011608081B2

(12) United States Patent
Michel

(10) Patent No.: US 11,608,081 B2
(45) Date of Patent: Mar. 21, 2023

(54) AUTONOMOUS VEHICLE LOW BATTERY MANAGEMENT

(71) Applicant: GM Cruise Holdings LLC, San Francisco, CA (US)

(72) Inventor: Marco Antonio Gaxiola Michel, South San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 261 days.

(21) Appl. No.: 16/987,297

(22) Filed: Aug. 6, 2020

(65) Prior Publication Data
US 2022/0041186 A1   Feb. 10, 2022

(51) Int. Cl.
*B60W 60/00* (2020.01)
*G05D 1/00* (2006.01)
*B60W 50/038* (2012.01)
*H02J 7/00* (2006.01)

(52) U.S. Cl.
CPC ...... *B60W 60/0023* (2020.02); *B60W 50/038* (2013.01); *B60W 60/00186* (2020.02); *G05D 1/0088* (2013.01); *H02J 7/0048* (2020.01); B60W 2510/244 (2013.01); B60W 2710/086 (2013.01); G05D 2201/0213 (2013.01)

(58) Field of Classification Search
CPC ....... B60W 60/0023; B60W 60/00186; B60W 50/038; B60W 2510/244; B60W 2710/086; H02J 7/0048; G05D 1/0088; G05D 2201/0213
See application file for complete search history.

(56) References Cited

U.S. PATENT DOCUMENTS

| | | | |
|---|---|---|---|
| 8,941,463 B2 | 1/2015 | Rovik et al. | |
| 8,989,954 B1* | 3/2015 | Addepalli | H04W 72/0493 |
| | | | 701/32.7 |
| 9,884,631 B2* | 2/2018 | James | B60R 11/04 |
| 9,958,864 B2* | 5/2018 | Kentley-Klay | G01C 21/26 |
| 10,259,448 B2* | 4/2019 | Bucknor | F02N 11/0837 |
| 10,343,631 B2* | 7/2019 | Poeppel | B60R 16/0236 |
| 10,386,836 B2* | 8/2019 | Lockwood | G05D 1/0214 |
| 10,611,258 B2* | 4/2020 | Symanow | H02J 7/0014 |
| 10,752,116 B2* | 8/2020 | Symanow | B60R 16/033 |
| 10,766,442 B2* | 9/2020 | Kwon | H02H 3/085 |
| 11,065,974 B2* | 7/2021 | Kodera | B60L 58/15 |
| 11,072,258 B2* | 7/2021 | Kumar | B60L 50/60 |
| 2014/0018975 A1* | 1/2014 | Maslyn | B60L 3/0046 |
| | | | 701/1 |
| 2015/0051763 A1* | 2/2015 | Enomoto | B60L 3/12 |
| | | | 701/22 |
| 2017/0123421 A1* | 5/2017 | Kentley | G06Q 10/00 |
| 2017/0355371 A1* | 12/2017 | Higgins | B60W 10/30 |
| 2018/0050686 A1* | 2/2018 | Atluri | B60K 6/387 |
| 2018/0105175 A1* | 4/2018 | Muller | B60R 16/037 |
| 2018/0134176 A1* | 5/2018 | Symanow | B60W 10/26 |

(Continued)

*Primary Examiner* — Ramsey Refai
(74) *Attorney, Agent, or Firm* — Akona IP

(57) ABSTRACT

Systems and methods are provided for identifying an imminent low state of charge of a battery in an autonomous vehicle, and automatically powering down the vehicle before a zero state of charge event occurs. In particular, the autonomous vehicle automatically powers down while there is enough energy in the batteries to restart the vehicle and drive the vehicle a short distance to a charging station.

20 Claims, 8 Drawing Sheets

(56) References Cited

U.S. PATENT DOCUMENTS

| | | | |
|---|---|---|---|
| 2018/0173219 A1* | 6/2018 | Lee | G01C 21/3492 |
| 2018/0334158 A1* | 11/2018 | Chen | B60W 10/30 |
| 2019/0212997 A1* | 7/2019 | Sangameswaran | H04L 67/52 |
| 2020/0298724 A1* | 9/2020 | Rhodes | G01R 31/3835 |
| 2020/0353944 A1* | 11/2020 | Urano | B60W 50/08 |
| 2021/0237667 A1* | 8/2021 | Zheng | B60L 3/12 |
| 2021/0407303 A1* | 12/2021 | Yogesha | G05D 1/1062 |

\* cited by examiner

AUTONOMOUS VEHICLE LOW BATTERY MANAGEMENT

FIELD OF THE DISCLOSURE

The present disclosure relates generally to battery management in vehicles and to systems and methods for managing batteries in vehicles and fleets of vehicles.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Most vehicles have integrated batteries for either starting or powering the vehicles. As more electric vehicles, including electric cars, have been developed, the demands on the batteries within the vehicles have increased. Autonomous vehicles often remain powered on when the vehicles return to garages, service centers, and other central parking areas. When a vehicle remains powered on, the batteries can run out of power. It is difficult and time-consuming to recover a vehicle that has experienced a low or dead battery.

SUMMARY

Systems and methods are provided for identifying an imminent low energy state in an autonomous vehicle, cutting power to vehicle components, and shutting down the vehicle, while leaving enough energy in the batteries to restart the vehicle and drive the vehicle a short distance.

According to one aspect, a method for automating a power down process for an autonomous vehicle, includes detecting, at an electronic control unit, a low state of charge of an autonomous vehicle battery, determining, using vehicle sensors, that the autonomous vehicle is unattended, determining, using autonomous vehicle mapping and location modules, that an autonomous vehicle location is in an approved shut down area, transmitting a shut down notice from the autonomous vehicle, and cutting power to vehicle components connected to the battery.

According to another aspect, an autonomous vehicle having an automatic power down process to prevent dead batteries, includes a high voltage battery for powering vehicle components, a sensor configured to determine whether the vehicle is unattended, an onboard computer configured to determine whether the vehicle is in a selected area, and an electronic control unit for determining a state of charge of the high voltage battery, wherein the electronic control unit is configured to detect a low state of charge of the high voltage battery, and cut power from the high voltage battery to the vehicle components.

According to another aspect, a system for managing autonomous vehicles in a fleet, includes a plurality of autonomous vehicles, and a central computing system in communication with each of the plurality of autonomous vehicles, configured to receive information from each of the plurality of autonomous vehicles, wherein the information includes a state of charge of a high voltage battery in each vehicle, and upon detecting a high voltage battery low state of charge in a first autonomous vehicle, transmit instructions to the first autonomous vehicle to cut power from the high voltage battery to vehicle components connected to the high voltage battery.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
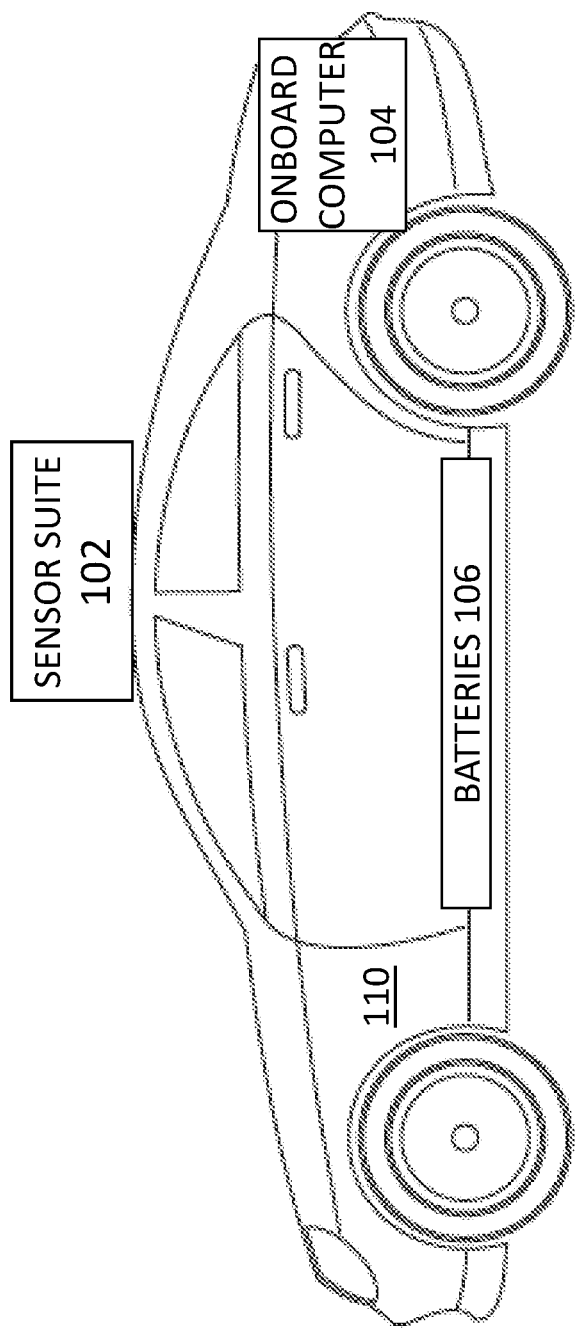
FIG. 1 is a diagram illustrating an autonomous vehicle, according to some embodiments of the disclosure.

Systems and methods are provided for vehicle low battery management. In particular, systems and methods are provided for an autonomous vehicle low energy strategy. Vehicle recovery from a dead battery state is a complicated and time-consuming process. Both the low voltage batteries and the high voltage battery need charge before the vehicle can move, and it can take several hours to provide an electric vehicle that has died with enough charge for the vehicle to move to a charging station. Currently, autonomous vehicles remain powered on upon returning to a garage, parking lot, service center, or other area, and the powered on autonomous vehicles are left unattended for long periods of time. The autonomous vehicles do not turn themselves off, and eventually both the high voltage and low voltage batteries fully die with zero power left. That is, both the high voltage battery and the low voltage battery reach a zero state of charge.

To restart an electric vehicle from a zero state of charge event, first the low voltage battery is charged, and then the high voltage battery is charged. It generally takes 1-2 hours of charging before the vehicle can engage in drive and move to a charging station. In some instances, when the vehicle batteries die in a parking lot, a long extension cord (e.g., a 120 Vac extension) has to be run to the vehicle to provide charge for a long period of time before the high voltage battery has gained a minimum state of charge to move the vehicle to a charging station.

Systems and methods are provided herein for automatically powering down an electric vehicle before a zero state of charge event occurs. In particular, a low energy strategy identifies potential situations that could lead to fully dead high voltage (HV) and low voltage (LV) battery events, and powers down the vehicle before a dead battery state is reached.

In some implementations, a method for preventing a dead battery state includes identifying a vehicle low power state, determining whether the vehicle is in a park mode, and determining whether the vehicle is unattended. When it is determined that a low power state is imminent, power to components that run on the high voltage battery is cut, and the high voltage battery stops charging the low voltage battery system. However, the power is cut with some amount of energy remaining in the high voltage battery, before a zero percent state of charge is reached. When power is cut, an event is created and notification of the HV battery power cut event is sent to a central computer. The notification may contain other relevant information, such as exact location of the vehicle. The power is cut when there is still enough energy left in the HV battery to turn on all HV components and drive the autonomous vehicle a short distance to a charger. In some implementations, the low voltage battery system detects that there is no longer support (charge) from the high voltage battery, that a low SOC in the low voltage battery system is imminent, and cuts power to the low voltage battery components. When power from both the high voltage battery system and the low voltage battery system is cut, the autonomous vehicle is completely off. However, power is cut leaving enough energy in both battery systems to allow the autonomous vehicle to restart and drive to a charging station.

Example Autonomous Vehicle Configured for Low Battery Management

FIG. 1 is a diagram 100 illustrating an autonomous vehicle 110, according to some embodiments of the disclosure. The autonomous vehicle 110 includes a sensor suite 102, an onboard computer 104, and batteries 106. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high fidelity map. In particular, data from the sensor suite can be used to update a map with information used to develop layers with waypoints identifying selected events, the locations of the encountered events, and the frequency with which the events are encountered at the identified location. In some examples, the presence and location of open parking spaces is detected and this information is recorded in a mapping system. In this way, sensor suite 102 data from many autonomous vehicles can continually provide feedback to the mapping system and the high fidelity map can be updated as more and more information is gathered.

The sensor suite 102 includes a plurality of sensors, and is coupled to the onboard computer 104, and the batteries 106. In some examples, the onboard computer 104 receives data captured by the sensor suite 102 and utilizes the data received from the sensors suite 102 in controlling operation of the autonomous vehicle 110. In some examples, one or more sensors in the sensor suite 102 are coupled to the batteries 106, and capture information regarding a state of charge of the batteries 106 and/or a state of health of the batteries 106.

The batteries 106 may include multiple batteries and/or battery cells. The batteries and/or battery cells may be coupled together. In some examples, the batteries 106 include a high voltage (HV) battery and one or more low voltage (LV) batteries. In some instances, the one or more LV batteries are 12V batteries. The batteries 106 are used for operation of the autonomous vehicle, for example to power the vehicle and to start the vehicle. In some implementations, the autonomous vehicle is an electric vehicle, and the batteries 106 provide power for movement of the vehicle among other operations of the vehicle. Furthermore, the batteries 106 power components of the autonomous vehicle including the sensor suite 102 and the onboard computer 104.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. Based upon the vehicle state and programmed instructions, the onboard computer 104 controls and/or modifies driving behavior of the autonomous vehicle 110.

In some implementations, the onboard computer 104 receives indications of the state of charge and/or state of health of the batteries 106 and determines operations to be performed by the autonomous vehicle 110 based on the state of the batteries 106. For example, the onboard computer 110 may determine the level of charge of the batteries 106, and the onboard computer 110 may determine that the batteries 106 need to be charged. In some implementations, based on a determined state of charge and/or state of health of the batteries 106, the onboard computer 106 may perform operations to address a condition of the batteries 106, such as causing the vehicle 106 to proceed to a charging station for charging the batteries 106 and causing charging of the batteries 106 to be stopped in response to determining the batteries 106 have been charged to a selected level of charge.

In some examples, the onboard computer 106 detects an imminent dead battery event and initiates an automatic shut down of the autonomous vehicle. In various implementations, the computer determines a state-of-charge of the batteries 106 based on a voltage of the batteries 106, a current drawn from the batteries 106, temperature of the batteries 106, other data related to the batteries 106, and/or a combination thereof.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example AV Battery and Charging Components

Figure 2:
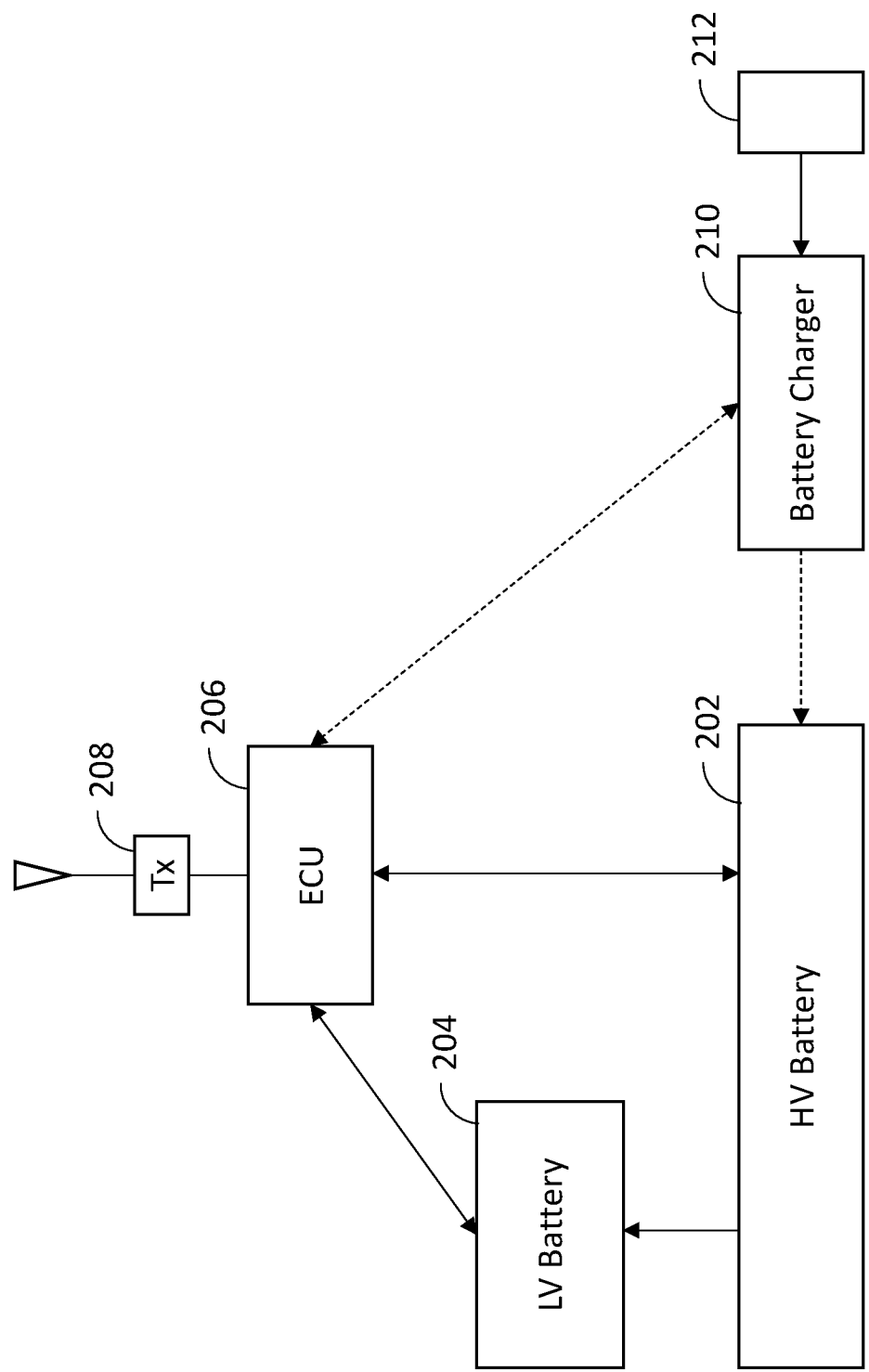
FIG. 2 is a diagram illustrating an example of an autonomous vehicle battery system, according to some embodiments of the disclosure.

FIG. 2 is a diagram illustrating an example of an autonomous vehicle battery system 200, according to various embodiments of the invention. The autonomous vehicle battery system 200 includes a high voltage battery 202, a low voltage battery 204, an electronic control unit 206, and a transceiver 208. Also shown in FIG. 2 are a battery charger 210, and a charging port 212. In some examples, the battery system 200 includes multiple low voltage batteries 204.

In various implementations, the high voltage battery 202 of an autonomous vehicle is the main power unit for the vehicle, and is responsible for providing the power to move the vehicle. Thus the high voltage battery 202 can store a large amount of energy, capable of powering the vehicle for many hours, and/or driving the vehicle for miles. Additionally, the high voltage battery 202 provides charge to the low voltage battery 204 as needed.

The low voltage battery 204 is an accessory battery that provides power to, for example, vehicle lights, radio(s), turn signals, LIDAR, RADAR, and other low voltage electronics in the vehicle. In some examples, the low voltage battery 204 powers a computer onboard the vehicle, as well as any signal transmissions and/or receptions. The low voltage battery 204 draws charge from the high voltage battery 202 as needed.

The electronic control unit 206 tracks state of charge of the high voltage 202 and low voltage 204 batteries. In some examples, the electronic control unit 206 tracks one or more of the current usage, voltage, and temperature of each of the batteries 202, 204, to determine the state of charge of each battery, and in particular, to determine the amount of energy left in each battery 202, 204. In some examples, the electronic control unit 206 also tracks state of health of the high voltage 202 and low voltage 204 batteries. The state of health tracks how the battery is aging over time. In some examples, the electronic control unit 206 is part of the onboard computer of the autonomous vehicle.

According to various implementations, the electronic control unit 206 determines when a state of charge of one of the batteries 202, 204 is at or below a selected threshold, and triggers an automatic shut down event as described in greater detail with respect to FIG. 3. In one example, the electronic control unit 206 implements the automatic shut down event to prevent the high voltage battery 202 from reaching a zero charge state. In particular, the electronic control unit 206 determines that a zero-charge state is imminent and triggers the automatic shut down. In some implementations, the electronic control unit determines a zero state of charge is imminent based on the state of charge of the high voltage battery. In some examples, the state of charge of the high voltage battery that triggers an automatic shut down event is one of about a 1% state of charge and about a 2% state of charge. According to various implementations, when the electronic control unit 206 activates the automatic shut down event, power to various components connected to the high voltage battery is disconnected, and the vehicle is powered down.

In another example, the electronic control unit 206 implements the automatic shut down event to prevent the low voltage battery 204 from reaching a zero charge state. According to one implementation, the electronic control unit 206 activates the automatic shut down event on the low voltage battery 204 after activating the automatic shut down event on the high voltage battery, and power to various components connected to the low voltage battery 204 is disconnected. In general, the automatic shut down powers down the autonomous vehicle while leaving a small amount of charge on the batteries 202, 204. The small amount of charge on the batteries 202, 204 is sufficient for the vehicle to start and drive to a charging station.

The transceiver 208 is coupled to the electronic control unit 206. The transceiver 208 can be used to transmit information about the batteries 202, 204, such as the state of charge of the batteries 202, 204. The transceiver 208 can also receive information. In some examples, the transceiver 208 transmits and receives information to/from a central computing system.

The battery charger 210 is a charging unit onboard the autonomous vehicle, connected to the high voltage battery 202 to provide charge to the high voltage battery 202. The battery charger 210 is connected to a charger port 212. External charging equipment can be plugged into the charger port 212 for charging the high voltage battery 202. In some examples, Electric Vehicle Supply Equipment or Electric Vehicle charging stations can be connected to the charger port 212 to charge the high voltage battery 202.

Example Method for Autonomous Vehicle Low Energy Power Down

Figure 3:
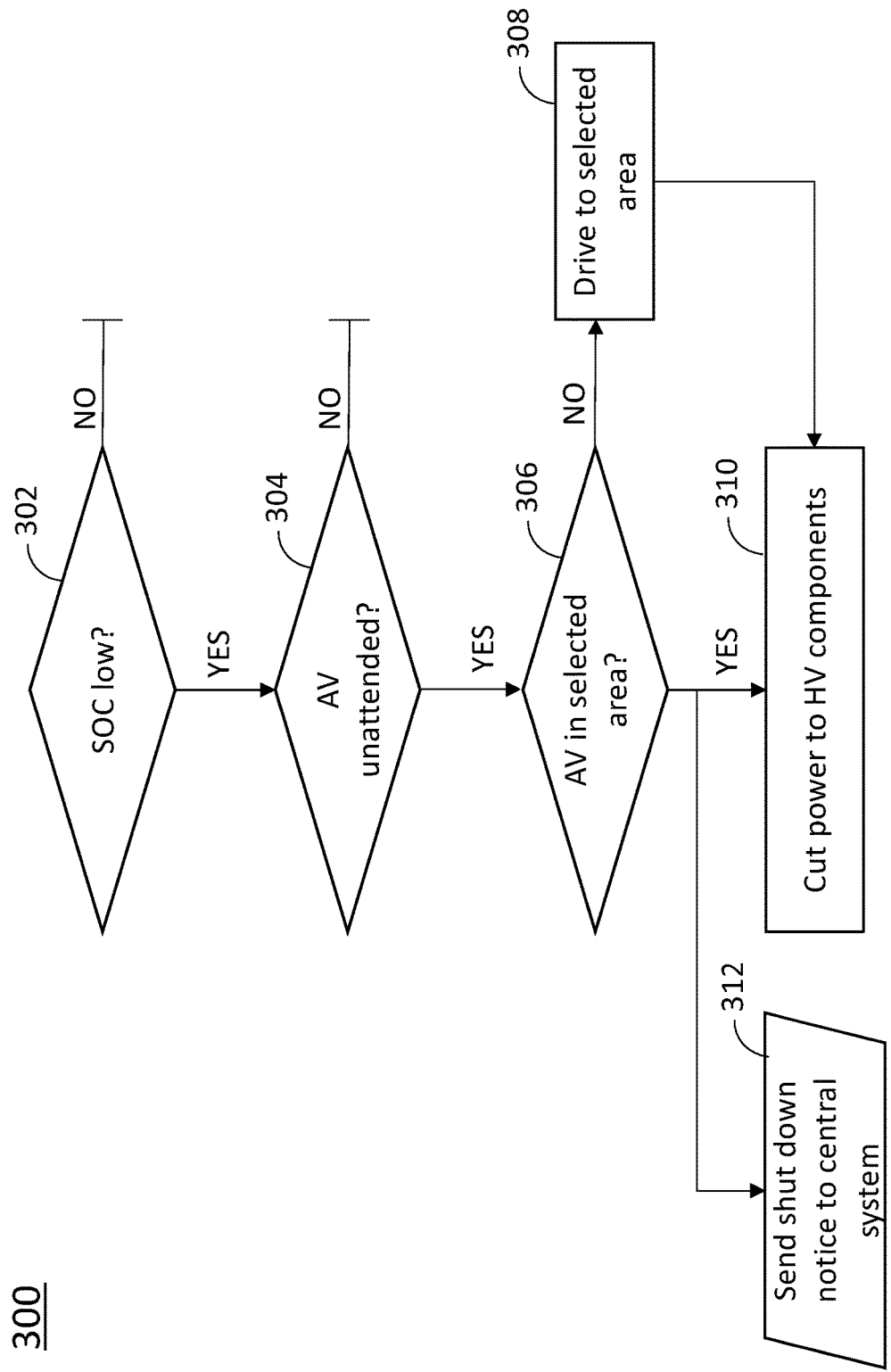
FIG. 3 is a diagram illustrating a method for automating a power down process for an autonomous vehicle, according to some embodiments of the disclosure.

FIG. 3 is a diagram illustrating a method 300 for automating a power down process for an autonomous vehicle, according to various embodiments of the invention. In particular, the method 300 powers down an autonomous vehicle before the vehicle's batteries die, in order to prevent a fully dead/discharged battery. The method 300 focuses on the high voltage battery of the electric vehicle, which is the main power source of the vehicle. At step 302, a state of charge of the high voltage (HV) battery is determined. In one example, the state of charge of the HV battery is compared to a selected threshold. In some examples, the threshold is about a 1% state of charge, about a 2% state of charge, or less than a 3% state of charge. The threshold may vary, for example depending on the distance between the vehicle and a charging station. For instance, the greater the distance to a charging station, the greater the threshold, such that there is sufficient state of charge remaining on the battery for the vehicle to restart and drive to a charging station. Generally, the threshold is very low, such that a dead battery event is imminent. In some examples, an imminent dead battery event means that the dead battery event will happen soon if no action is taken. For instance, an imminent dead battery event may mean the battery will die in about one hour. However, the threshold is based on the state of charge used to restart the vehicle following shut down plus the amount of charge to drive the vehicle to the nearest charging station. If the state of charge exceeds the threshold, no action is taken at step 302, and the method 300 ends. If the state of charge of the HV battery is equal to or below the selected threshold, the method 300 proceeds to step 304.

At step 304, it is determined whether the autonomous vehicle is unattended. First, it is determined that the autonomous vehicle is in one of park mode, service mode, and propulsion system active (PSA) mode. Also, it is determined whether the vehicle doors are closed. Additionally, to determine if the vehicle is unattended, it is determined whether there are any passengers in the vehicle, as well as whether there are any technicians or service personnel in or around the vehicle, attending to the vehicle. In some examples, autonomous vehicle sensors are used sense people in or around the vehicle to determine whether the vehicle is unattended. If the autonomous vehicle is being attended (i.e., the AV is not unattended), the method ends at step 304 and no action is taken. In some examples, if the autonomous vehicle is being attended, a warning is triggered to alert the attendant that a zero-charge battery state is imminent. If the autonomous vehicle is unattended at step 304, the method proceeds to step 306.

At step 306, it is determined whether the autonomous vehicle is within a selected area. In particular, in some examples, selected areas are geofenced and recognized as approved areas for automatic power down of the vehicle. The selected areas may include one or more garages, parking lots, electric vehicle charging stations, and various parking spaces. If, at step 306, the autonomous vehicle is not within a selected area, at step 308, the autonomous vehicle drives to a selected area. This is to avoid a dead battery event at a non-preferred location. At step 306, if the autonomous vehicle is within a selected area, the method proceeds to step 310, and high voltage battery power is cut, causing the autonomous vehicle to power down. In some examples, cutting HV battery power includes opening component contacts, such that energy no longer flows from the HV battery to various components. In various implementations, at step 312, a message is transmitted to a central computing system, wherein the message includes an alert that the autonomous vehicle has reached a very low power state and is powering down. The message may include the vehicle's location, state of charge of the battery at shut down, and other relevant information. In some implementations, even during an automatic shut down event, some components remain powered on. For example, the key fob key code reception module remains powered on, such that the vehicle can be unlocked.

In some implementations, the method 300 skips step 306 and proceeds from step 304 to step 310, cutting high voltage battery power and causing the autonomous vehicle to power down. This can happen if, for example, the vehicle is impounded and cannot be driven back to a selected area.

Figure 4:
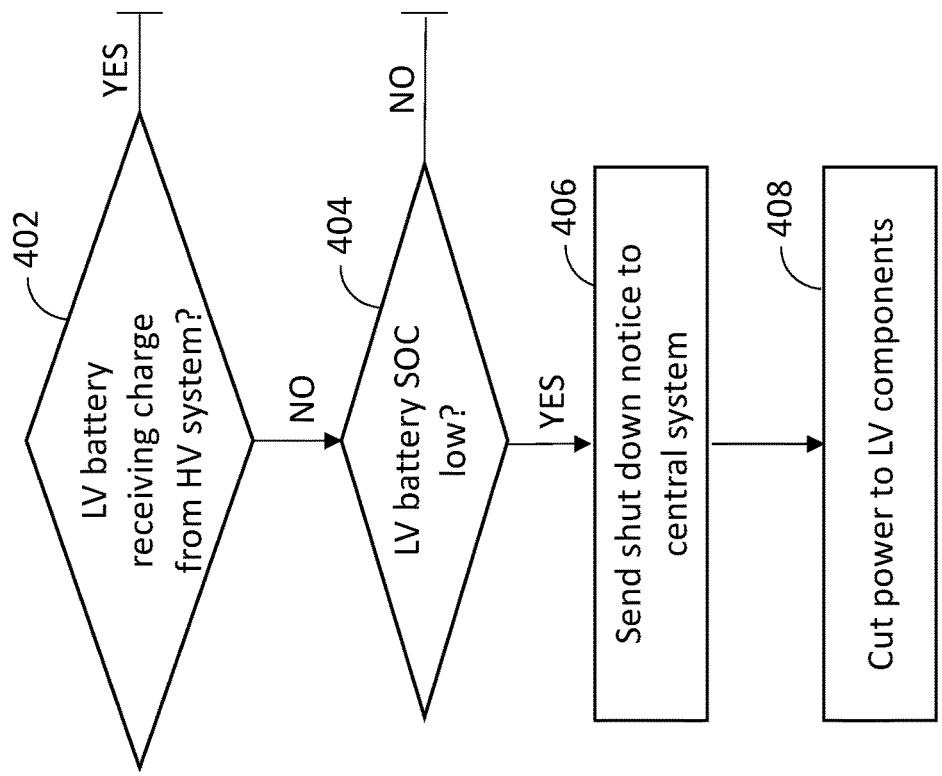
FIG. 4 is a diagram illustrating a method for automating a power down process for a low voltage battery of an autonomous vehicle, according to some embodiments of the disclosure.

FIG. 4 is a diagram illustrating a method 400 for automating a power down process for a low voltage battery of an autonomous vehicle, according to various embodiments of the invention. In particular, the method 400 powers down an autonomous vehicle's low voltage battery before the battery dies, with the goal of preventing a fully dead/discharged low voltage battery. In various examples, when a low voltage battery dies, typically because it stopped receiving charge from the high voltage battery for other reasons, it cannot be recharged by the high voltage battery, and an external connection is used for restarting the low voltage battery. In some examples, the method 400 occurs after the low voltage battery stops receiving charge from the high voltage battery, such as following the method 300 of FIG. 3.

At step 402, it is determined whether the LV battery is receiving charge from the high voltage battery. If the LV battery is receiving charge from the high voltage battery, no action is taken at step 402 and the method ends. If the LV battery is not receiving charge from the high voltage battery, the method 400 proceeds to step 404 At step 404, a state of charge of the low voltage (LV) battery is determined. In one example, the state of charge of the LV battery is compared to a selected threshold. If the state of charge exceeds the threshold, no action is taken at step 404, and the method 400 ends. In some examples, if the state of charge exceeds the threshold, no action is taken at step 404, but the method proceeds to wait a selected period of time and repeat step 404. If the state of charge of the LV battery is equal to or below the selected threshold, the method 400 proceeds to step 406. At step 406, a power down alert message is sent to a central computing system. The message may include the vehicle's location, state of charge of the battery at shut down, and other relevant information. At step 408, power is cut to low voltage vehicle components.

Figure 5:
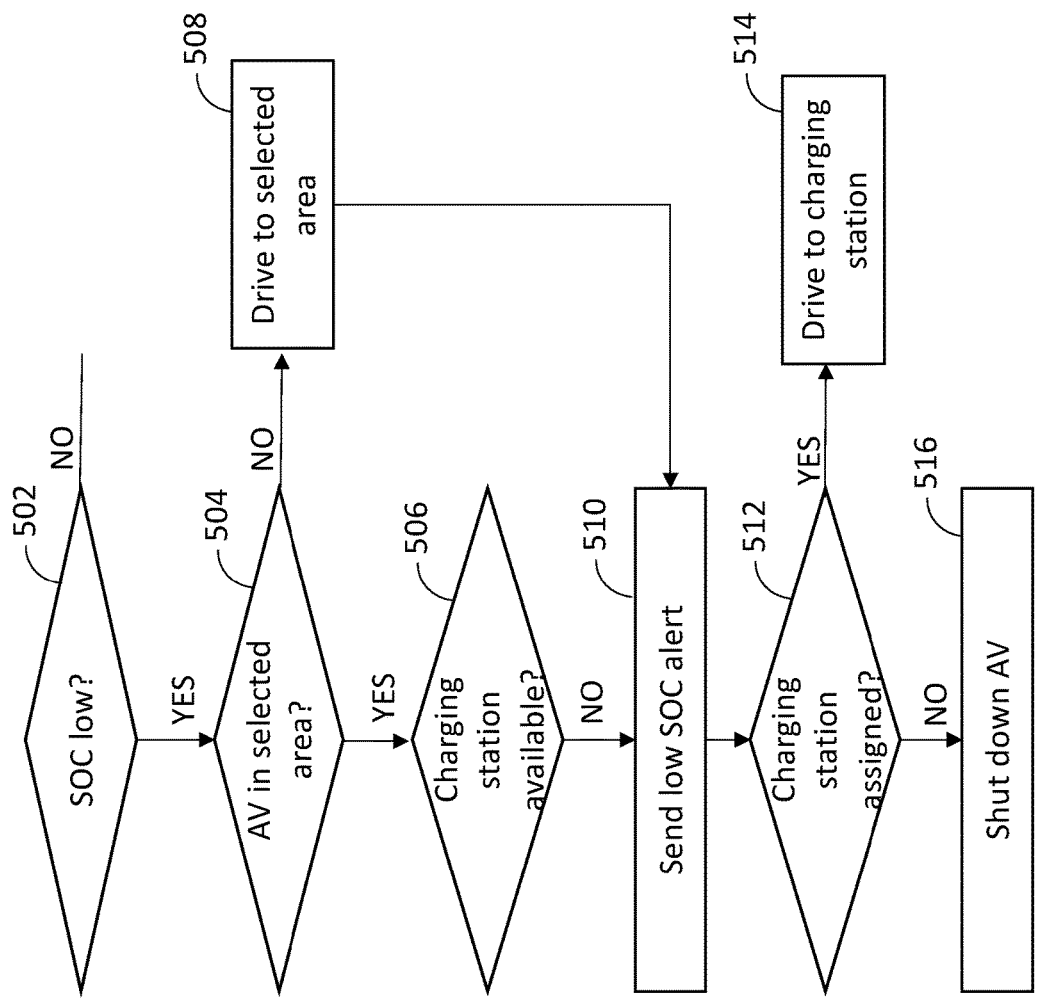
FIG. 5 is a diagram illustrating a method for automating a power down process for a high voltage battery of an autonomous vehicle, according to some embodiments of the invention.

FIG. 5 is a diagram illustrating a method 500 for automating a power down process for a high voltage battery of an autonomous vehicle, according to various embodiments of the invention. The method 500 is similar to the method 300 of FIG. 3, but before deciding to power down, the autonomous vehicle requests a charging station. As shown in the method 500, if a vehicle is close to one or more charging stations, but other vehicles are occupying the charging stations, the vehicle sends a message to a central computer requesting a charging station. The message may contain a low state of charge alert. Thus, a central computing system (as described in greater detail with respect to FIG. 7) receives the request and can decide to prioritize charging of the low state of charge vehicle.

At step 502, a state of charge of the high voltage (HV) battery is determined. If the state of charge exceeds a threshold, as described above, no action is taken at step 502, and the method 500 ends. If the state of charge of the HV battery is equal to or below the selected threshold, the method 500 proceeds to step 504. At step 504, it is determined if the autonomous vehicle is in a selected area, as described above with respect to FIG. 3. If, at step 504, the autonomous vehicle is not within a selected area, at step 508, the autonomous vehicle drives to a selected area, with the goal of avoiding a dead battery at a non-preferred location. At step 506, it is determined if a charging station is available. If a charging station is available, the vehicle drives to the parking space for the available charging station for charging. If an attendant is needed to begin the charging process, and the process is not begun promptly, the method 500 may still proceed to step 516 to avoid a dead battery.

At step 506, if no charging station is available, the autonomous vehicle sends a request for a charging station to a central computing system. The central computing system is a fleet management system, as described in greater detail with respect to FIG. 7. The request may include a low state of charge alert, and it may include an imminent dead battery alert. The central computing system may evaluate the other vehicles in the fleet that are currently the nearby charging stations, and decide whether to direct one of the vehicles to move from a charging station to open the charging station for the autonomous vehicle with the low state of charge. At step 512, the autonomous vehicle determines whether a charging station has been assigned. If a charging station has been assigned to the autonomous vehicle, the vehicle drives to the charging station at step 514, and begins charging. If no charging station has been assigned to the autonomous vehicle, the method 500 proceeds to step 516, and power from the HV battery is cut, powering down the autonomous vehicle.

Figure 6:
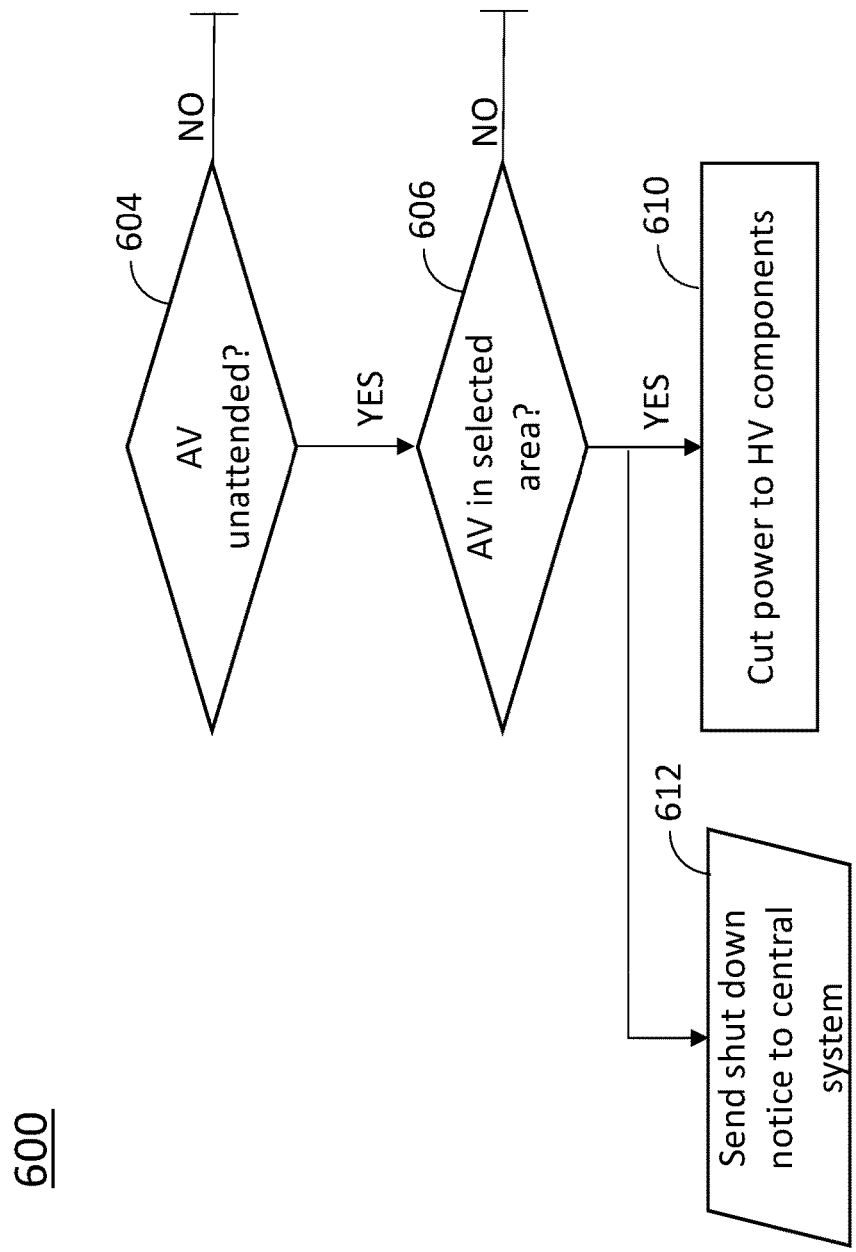
FIG. 6 is a diagram illustrating a method for automating a power down process for a high voltage battery of an autonomous vehicle, according to some embodiments of the invention.

FIG. 6 is a diagram illustrating a method 600 for automating a power down process for a high voltage battery of an autonomous vehicle, according to various embodiments of the invention. The method 600 is similar to the method 300 of FIG. 3, but the unattended autonomous vehicle powers down regardless of the state of charge of the high voltage battery. In particular, the method 600 may be applied when an autonomous vehicle is parked in a selected parking lot or garage, unattended, regardless of the state of charge of the vehicle. In some examples, the method 600 is performed following an accident, or another event that causes the autonomous vehicle to be out of service for an extended period of time. At step 604, it is determined whether the autonomous vehicle is unattended. This includes first determining whether the autonomous vehicle is in park mode and the doors are closed. As described above with respect to FIG. 3, autonomous vehicle sensors are used to determine whether there are any passengers in the vehicle, as well as whether there are any technicians or service personnel attending the vehicle. If the autonomous vehicle is being attended, the method ends at step 604 and no action is taken. If the autonomous vehicle is unattended at step 604, the method proceeds to step 606.

At step 606, it is determined whether the autonomous vehicle is within a selected area. In particular, in some examples, as described above, selected areas are geofenced and recognized as approved areas for automatic power down of the vehicle. If, at step 606, the autonomous vehicle is not within a selected area, the method 600 ends and no further action is taken. At step 606, if the autonomous vehicle is within a selected area, the method proceeds to step 610, and high voltage battery power is cut, causing the autonomous vehicle to power down. In various implementations, at step 612, a message is transmitted to a central computing system, wherein the message includes an alert that the autonomous vehicle is powering down. The message may include the vehicle's location, state of charge of the battery at shut down, and other relevant information. In various examples, the method 600 is triggered by a central computer, such as the central computer described with respect to FIG. 7.

In some implementations, the method 600 skips step 606 and proceeds from step 604 to step 610, cutting high voltage battery power and causing the autonomous vehicle to power down. This can happen if, for example, the vehicle is impounded and cannot be driven back to a selected area.

Example of Autonomous Vehicle Fleet

Figure 7:
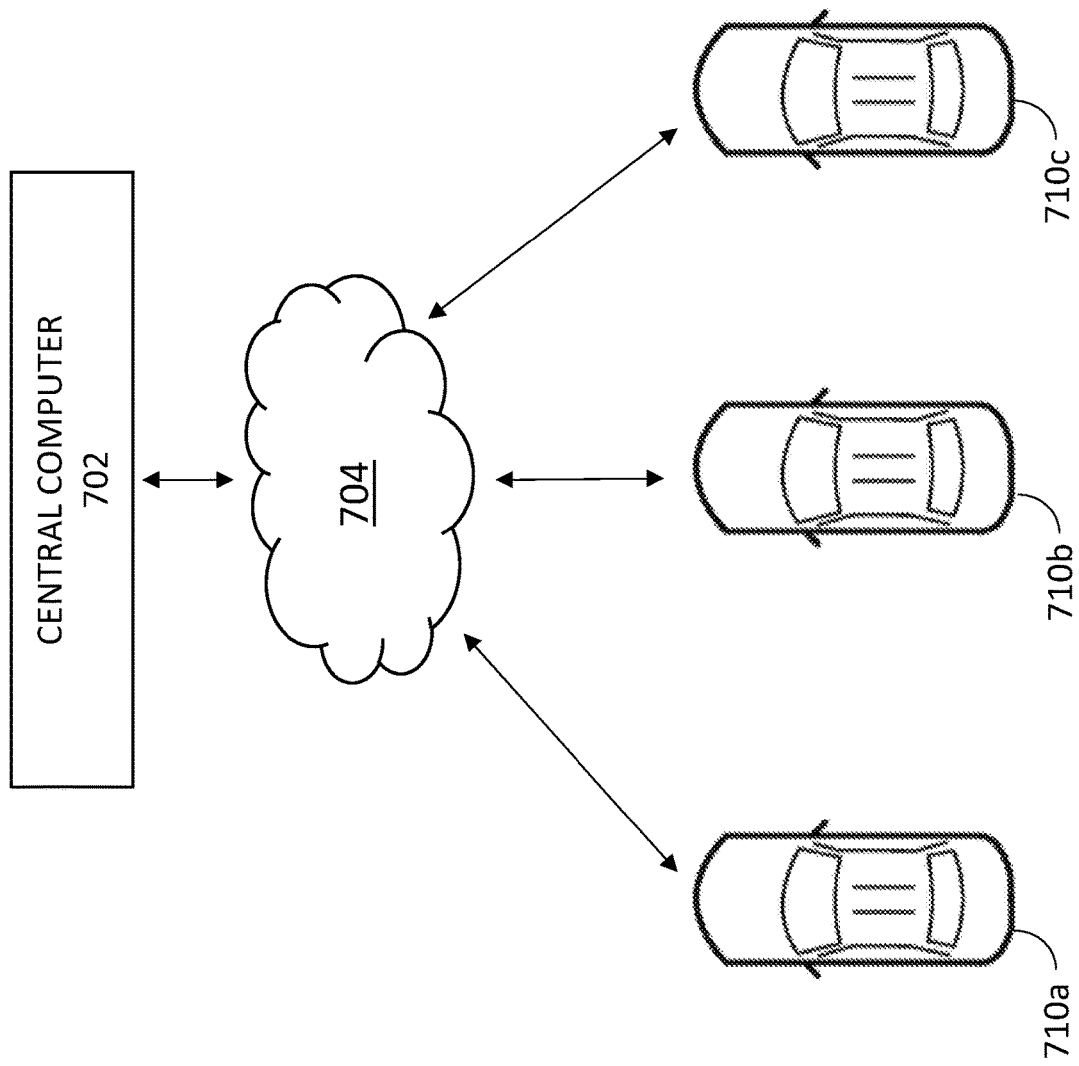
FIG. 7 is a diagram illustrating a fleet of autonomous vehicles in communication with a central computer, according to some embodiments of the disclosure.

FIG. 7 is a diagram illustrating a fleet of autonomous vehicles 710a-710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-710c in the fleet. Autonomous vehicle fleet routing refers to the routing of multiple vehicles in a fleet. In some implementations, autonomous vehicles communicate directly with each other.

When a ride request is received from a passenger, the routing coordinator selects an autonomous vehicle 710a-710c to fulfill the ride request, and generates a route for the autonomous vehicle 710a-710c. The generated route includes a route from the autonomous vehicle's present location to the pick-up location, and a route from the pick-up location to the final destination. In some examples, the ride request includes a stop request and the generated route includes a route to the stop location.

Each vehicle 710a-710c in the fleet of vehicles communicates with a routing coordinator. In some examples, the vehicles 710a-710c send information to the routing coordinator such battery state of charge for each vehicle's HV and LV batteries. In various examples, when the state of charge of a HV battery of a vehicle 710a-710c drops below a selected threshold, the routing coordinator directs the autonomous vehicle to return to a charging station. In some implementations, when the state of charge of a HV battery of a vehicle 710a-710c drops below a low power threshold, such that a dead battery event is imminent, the vehicle powers down as described with respect to FIG. 3, and communicates the power down event with the routing coordinator.

Additionally, information gathered by various autonomous vehicles 710a-710c in the fleet can be communicated with the routing coordinator, where it is saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals.

According to various implementations, a set of parameters can be established that determine which metrics are considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes minimizing power expenditure and conserving charge on the HV battery of the vehicle.

Routing goals may be specific or general in terms of both the vehicles they are applied to and over what timeframe they are applied. As an example of routing goal specificity in vehicles, a routing goa may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination and/or any intermediate stop. Similarly, in some examples, during an intermediate stop, the onboard computer determines whether the autonomous vehicle parks or continues to drive and circles back to the pick-up location. In some implementations, the routing coordinator in the central computing system 702 generates a route for each selected autonomous vehicle 710a-710c, and the routing coordinator determines a route for the autonomous vehicle 710a-710c to travel from the autonomous vehicle's current location to a first intermediate stop.

In some implementations, each vehicle 710a-710c provides an indication of the state of charge of the vehicle's battery to the central computing system 702. The central computing system 702 may include one or more battery data databases to store state of charge for each vehicle 710a-710c. The battery data databases may be communicatively coupled to the central computing system 702 and the battery data databases may be stored on one or more servers and/or other memory devices. The battery data databases may store data related to charging and/or discharging of batteries, such as charging curves of the batteries and/or discharging curves of the batteries.

In various implementations, the central computing system 702 determines power requirements for various routes, and state of charge of the battery in each vehicle 710a-710c is considered in selecting a vehicle to fulfill a route request. Furthermore, the central computing system 702 can predict when a vehicle 710-a710c state of charge will reach a low level, and determine when the vehicle 710a-710c will be routed to a charging center.

In some implementations, the central computing system 702 flags a low state of charge for a vehicle and sends instructions to the vehicle to initiate an automatic shut down event, as described with respect to FIG. 3.

The central computing system 702 and routing coordinator may further include data regarding battery maintenance activities during routing assignments. The data regarding battery maintenance activities may include allowable charging frequency for the routing assignments (i.e., how often a battery may be charged during the assignments, which may be indicated as the minimum amount of time between which a vehicle can return to a charging station for charging of the battery), allowable charge-times (i.e., the maximum amount of time that a vehicle can remain at a charging station for a charge cycle of the battery before returning to routing assignments), amount of time the vehicle is to be on the road during the routing assignments, rates of charging available, or some combination thereof. The data regarding battery maintenance activity may be utilized by the central computing system 702 to determine manage battery levels of the fleet of vehicles.

In some implementations, the central computing system 702 stores additional battery-related information for each vehicle in the battery databases. For example, the battery databases may include data regarding, battery age for batteries in each of the vehicles, cost of battery replacement for each of the batteries, effects on hardware of each of the vehicles, hardware arrangements of the vehicles (such as sensors of the vehicles, control systems of the vehicles, and/or software implemented on the vehicles), or some combination thereof. The central computing system 702 may utilize the vehicle-specific information to determine vehicle-specific current draw from the battery and/or the cost of replacing the battery.

The central computing system 702 battery database may further include data related to environmental factors for the routing assignments, since environmental factors can affect power usage. The data related to the environmental factors may include environmental data (such as temperature, wind, and/or rain) and route data (such as grades of the terrain) for the routing assignments. In some embodiments, the battery databases may further include data indicating the effects of the environmental factors on current draw and/or charging due to regenerative braking for the routing assignments. The central computing system 702 utilizes the data related to the environmental factors to compensate for changes in the amount of charge used for the routing assignments and/or the current draw on the batteries of the vehicles when assigned to the routing assignments.

In some implementations, the central computing system 702 receives indications of battery states for the batteries of the vehicles in the fleet. The central computing system 702 can generate or update one or more state-of-charge profiles for each of the batteries based on a determined degradation level and the data from the battery databases. Each state-of-charge profile of the state-of-charge profiles may include an upper bound value that indicates a maximum optimal charge for the battery and a lower bound value that indicates a minimum optimal charge for the battery. Each state of charge profile also includes a low threshold state of charge for triggering an automatic shut down event.

In some implementations, the central computing system 702 determines characteristics for the routing assignments. For example, the characteristics may include the predicted amounts of energy for the routing assignments, the anticipated charging frequency for each vehicle, the charge-times for each vehicle, the amount of time each vehicle will be on the road, and/or the rate of charging available. Based on the characteristics, the central computing system 702 selects vehicles from the available vehicles that satisfy the characteristics of the routing assignments.

Example of a Computing System for Ride Requests

Figure 8:
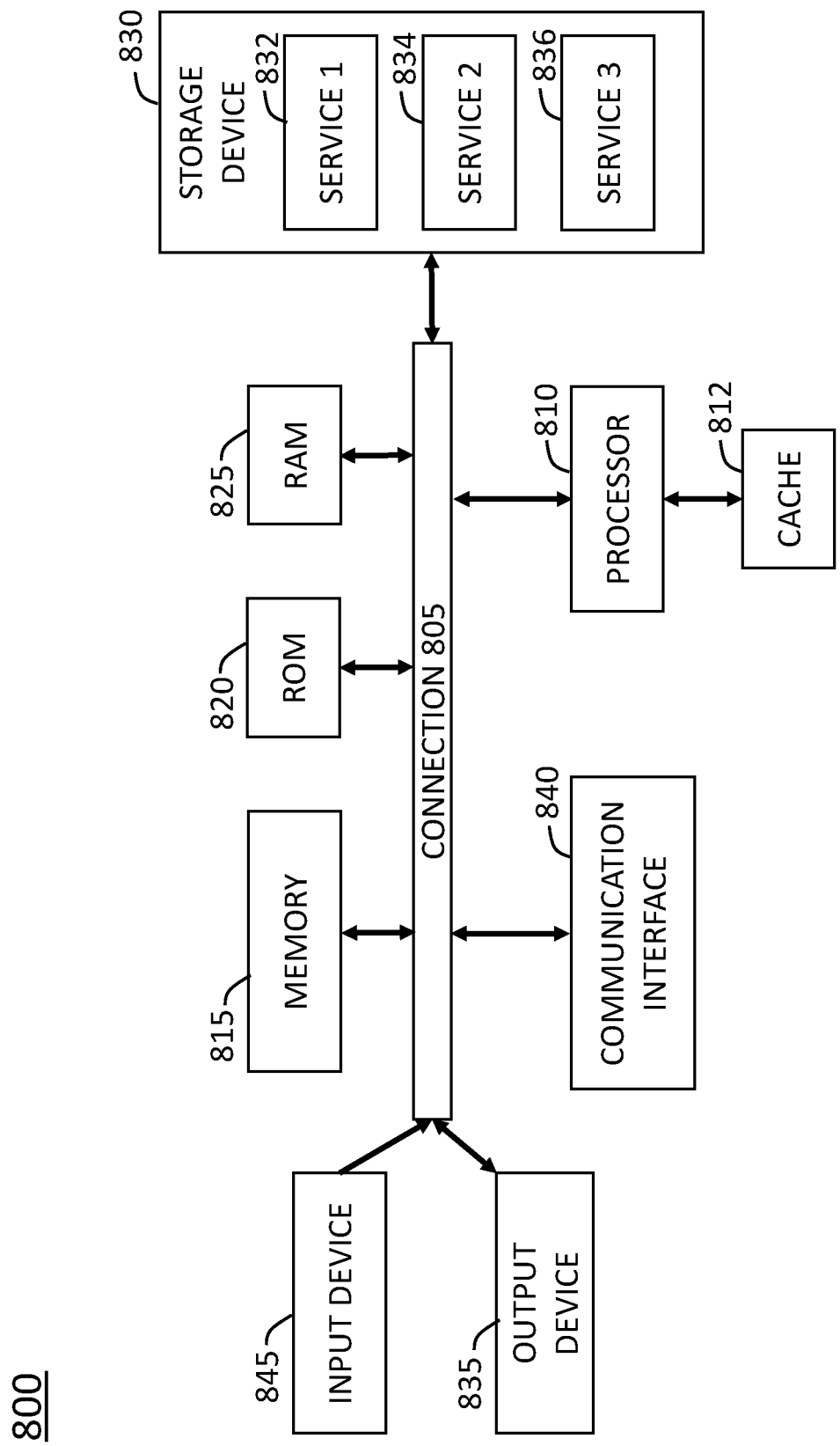
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 702, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for automating a power down process for an autonomous vehicle, including detecting, at an electronic control unit, a low state of charge of an autonomous vehicle battery, determining, using vehicle sensors, that the autonomous vehicle is unattended, determining, using autonomous vehicle mapping and location modules, that an autonomous vehicle location is in an approved shut down area, transmitting a shut down notice from the autonomous vehicle, and cutting power to vehicle components connected to the battery.

Example 2 provides a method according to example 1, wherein detecting the low state of charge includes detecting a high voltage battery low state of charge.

Example 3 provides a method according to one or more of the preceding examples, including detecting a low voltage battery low state of charge and cutting power to additional vehicle components connected to the low voltage battery.

Example 4 provides a method according to one or more of the preceding examples wherein detecting the low state of charge includes comparing a high voltage battery state of charge to a selected threshold value, and determining that the high voltage battery state of charge is less than the selected threshold value.

Example 5 provides a method according to one or more of the preceding examples wherein the selected threshold value includes sufficient charge for the high voltage battery to restart the autonomous vehicle and drive the autonomous vehicle to a charging station.

Example 6 provides a method according to one or more of the preceding examples wherein cutting power to vehicle components results in powering down the autonomous vehicle.

Example 7 provides a method according to one or more of the preceding examples, wherein determining the vehicle is unattended includes determining the vehicle is in one of park mode and service mode, and determining that vehicle doors are closed.

Example 8 provides a method according to one or more of the preceding examples wherein detecting the low state of charge includes detecting an imminent dead battery event.

Example 9 provides an autonomous vehicle having an automatic power down process to prevent dead batteries, including a high voltage battery for powering vehicle components, a sensor configured to determine whether the vehicle is unattended, an onboard computer configured to determine whether the vehicle is in a selected area, and an electronic control unit for determining a state of charge of the high voltage battery, wherein the electronic control unit is configured to detect a low state of charge of the high voltage battery, and cut power from the high voltage battery to the vehicle components.

Example 10 provides an autonomous vehicle according to one or more of the preceding examples wherein the electronic control unit is coupled to the sensor and the onboard computer, and the electronic control unit is configured to cut power when the sensor determines the vehicle is unattended and the onboard computer determines the vehicle is in the selected area.

Example 11 provides an autonomous vehicle according to one or more of the preceding examples wherein the electronic control unit is configured to detect a low state of charge when a dead battery event is imminent.

Example 12 provides an autonomous vehicle according to one or more of the preceding examples the sensor is further configured to determine whether the vehicle is in park mode and whether vehicle doors are closed.

Example 13 provides an autonomous vehicle according to one or more of the preceding examples further comprising a low voltage battery for powering additional vehicle components, wherein the low voltage battery receives power from the high voltage battery.

Example 14 provides an autonomous vehicle according to one or more of the preceding examples, wherein the electronic control unit is further configured to detect a low state of charge of the low voltage battery and cut power from the low voltage battery to the additional vehicle components.

Example 15 provides an autonomous vehicle according to one or more of the preceding examples, wherein the onboard computer is further configured to transmit a vehicle shut down notice when the electronic control unit cuts power from the high voltage battery.

Example 16 provides an autonomous vehicle according to one or more of the preceding examples, wherein the vehicle shut down notice includes the location of the autonomous vehicle and the state of charge of the high voltage battery when the electronic control unit cuts power from the high voltage battery.

Example 17 provides a system for managing autonomous vehicles in a fleet, comprising a plurality of autonomous vehicles, and a central computing system in communication with each of the plurality of autonomous vehicles, configured to receive information from each of the plurality of autonomous vehicles, wherein the information includes a state of charge of a high voltage battery in each vehicle, and upon detecting a high voltage battery low state of charge in a first autonomous vehicle, transmit instructions to the first autonomous vehicle to cut power from the high voltage battery to vehicle components connected to the high voltage battery.

Example 18 provides a system according to one or more of the preceding examples, wherein the central computing system is further configured to determine the first autonomous vehicle is unattended, and to determine the autonomous vehicle is located in an approved shut down area.

Example 19 provides a system according to one or more of the preceding examples, wherein the central computing system is further configured to, upon detecting a low voltage battery low state of charge in a first autonomous vehicle, transmit instructions to the first autonomous vehicle to cut power from the low voltage battery to additional vehicle components connected to the low voltage battery.

Example 20 provides a system according to one or more of the preceding examples, wherein the central computing system is further configured to compare a high voltage battery state of charge to a selected threshold value, and determine that the high voltage battery state of charge is less than the selected threshold value, wherein the selected threshold value includes sufficient charge for the high voltage battery to restart the first autonomous vehicle and drive the first autonomous vehicle to a charging station.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for automating a power down process for an autonomous vehicle, comprising:
   detecting, at an electronic control unit, a low state of charge of an autonomous vehicle high voltage battery,
   determining, using vehicle sensors, that the autonomous vehicle is unattended,
   determining, using autonomous vehicle mapping and location modules, that an autonomous vehicle location is in an approved shut down area,
   transmitting a shut down notice from the autonomous vehicle,
   cutting power to vehicle components connected to the high voltage battery,
   detecting a low voltage battery low state of charge,
   determining that the low voltage battery is not receiving charge from the high voltage battery, and
   cutting power to additional vehicle components connected to the low voltage battery.

2. The method of claim 1, where detecting the high voltage battery low state of charge includes comparing a high voltage battery state of charge to a selected threshold value, and determining that the high voltage battery state of charge is less than the selected threshold value.

3. The method of claim 2, wherein the selected threshold value includes sufficient charge for the high voltage battery to restart the autonomous vehicle and drive the autonomous vehicle to a charging station.

4. The method of claim 1, wherein cutting power to vehicle components results in shutting off the autonomous vehicle.

5. The method of claim 1, wherein determining the vehicle is unattended includes determining the vehicle is in one of park mode and service mode, and determining that vehicle doors are closed.

6. The method of claim 1, wherein detecting the low state of charge includes detecting an imminent dead battery event, wherein the high voltage battery has less than a three percent state of charge.

7. An autonomous vehicle having an automatic power down process to prevent dead batteries, comprising:
   a high voltage battery for powering vehicle components;
   a low voltage battery for powering additional vehicle components;
   a sensor configured to determine whether the vehicle is unattended;
   an onboard computer configured to determine whether the vehicle is in a selected area; and
   an electronic control unit for determining a state of charge of the high voltage battery, wherein the electronic control unit is configured to:
   detect a low state of charge of the high voltage battery,
   cut power from the high voltage battery to the vehicle components,
   detect a low voltage battery low state of charge,
   determine that the low voltage battery is not receiving charge from the high voltage battery, and
   cut power from the low voltage battery to the additional vehicle components.

8. The autonomous vehicle of claim 7, wherein the electronic control unit is coupled to the sensor and the onboard computer, and the electronic control unit is configured to cut power when the sensor determines the vehicle is unattended and the onboard computer determines the vehicle is in the selected area.

9. The autonomous vehicle of claim 7, wherein the electronic control unit is configured to detect a low state of charge when a dead battery event is imminent.

10. The autonomous vehicle of claim 7, wherein the sensor is further configured to determine whether the vehicle is in park mode and whether vehicle doors are closed.

11. The autonomous vehicle of claim 7, wherein the onboard computer is further configured to transmit a vehicle shut down notice when the electronic control unit cuts power from the high voltage battery.

12. The autonomous vehicle of claim 11, wherein the vehicle shut down notice includes the location of the autonomous vehicle and the state of charge of the high voltage battery when the electronic control unit cuts power from the high voltage battery.

13. A system for managing autonomous vehicles in a fleet, comprising:
   a plurality of autonomous vehicles;
   a central computing system in communication with each of the plurality of autonomous vehicles, configured to:
   receive information from each of the plurality of autonomous vehicles, wherein the information includes a state of charge of a high voltage battery in each vehicle, and
   upon detecting a high voltage battery low state of charge in a first autonomous vehicle, transmit instructions to the first autonomous vehicle to:
   cut power from the high voltage battery to vehicle components connected to the high voltage battery,
   determine a low voltage battery state of charge,
   determine that the low voltage battery is not receiving charge from the high voltage battery, and
   upon detection of a low voltage battery low state of charge, cut power from the low voltage battery to the additional vehicle components.

14. The system of claim 13, wherein the central computing system is further configured to determine the first autonomous vehicle is unattended, and to determine the autonomous vehicle is located in an approved shut down area.

15. The system of claim 13, wherein the central computing system is further configured to:
   compare a high voltage battery state of charge to a selected threshold value, and determine that the high voltage battery state of charge is less than the selected threshold value,
   wherein the selected threshold value includes sufficient charge for the high voltage battery to restart the first autonomous vehicle and drive the first autonomous vehicle to a charging station.

16. The method of claim 1, wherein detecting the low voltage battery low state of charge includes comparing a low voltage battery state of charge to a selected threshold value, and determining that the low voltage battery state of charge is less than the selected threshold value.

17. The method of claim 1, wherein cutting power to vehicle components connected to the high voltage battery includes opening component contacts such that no energy flows from the high voltage battery to the vehicle components.

18. The autonomous vehicle of claim 7, wherein the low voltage battery is connected to the high voltage battery, and wherein the electronic control unit is to detect the low voltage battery low state of charge by comparing a low voltage battery state of charge to a selected threshold value, and determining that the low voltage battery state of charge is less than the selected threshold value.

19. The system of claim 13, wherein the central computing system is to detect a low voltage battery low state of charge in a first autonomous vehicle by comparing a low voltage battery state of charge to a selected threshold value, and determining that the low voltage battery state of charge is less than the selected threshold value.

20. The system of claim 13, wherein the central computing system is to, based on a first state of charge of a first high voltage battery in the first autonomous vehicle, detect the high voltage battery low state of charge when a dead battery event is imminent in the first autonomous vehicle.

* * * * *